(12) United States Patent
Gaither

(10) Patent No.: US 10,017,053 B2
(45) Date of Patent: Jul. 10, 2018

(54) FLUID TURBINE SYSTEMS FOR HARNESSING LIGHT RADIANT ENERGY, THERMAL ENERGY AND KINETIC ENERGY IN VEHICLES AND METHODS OF OPERATING THEREOF

(71) Applicant: Toyota Motor Engineering & Manufacturing North America, Inc., Erlanger, KY (US)

(72) Inventor: Geoffrey Gaither, Torrance, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 152 days.

(21) Appl. No.: 14/871,528

(22) Filed: Sep. 30, 2015

(65) Prior Publication Data

US 2017/0087973 A1 Mar. 30, 2017

(51) Int. Cl.
 *B60K 16/00* (2006.01)
 *F03B 13/00* (2006.01)
 *F03G 6/00* (2006.01)

(52) U.S. Cl.
 CPC .............. *B60K 16/00* (2013.01); *F03B 13/00* (2013.01); *F03G 6/00* (2013.01); *F03G 6/003* (2013.01);
(Continued)

(58) Field of Classification Search
None
See application file for complete search history.

(56) References Cited

U.S. PATENT DOCUMENTS 3,971,454 A 7/1976 Waterbury
4,061,200 A 12/1977 Thompson
(Continued)

FOREIGN PATENT DOCUMENTS

CA 2 471 153 12/2005
DE 102009023770 7/2010
(Continued)

OTHER PUBLICATIONS

Website: http://www.toyotapartsoverstock.com/showAssembly.aspx?ukey_product=3973068&ukey_assembly=517720; Accessed Sep. 30, 2015; 4 pages.
(Continued)

*Primary Examiner* — James A Shriver, II
*Assistant Examiner* — Hilary L Johns
(74) *Attorney, Agent, or Firm* — Snell & Wilmer LLP

(57) ABSTRACT

A fluid turbine system is provided for harnessing light radiant energy, thermal energy and/or kinetic energy of a vehicle. At least one fluid tube is coupled with a body portion of the vehicle. At least a portion of the at least one fluid tube is positioned proximal to the vehicle's roof, the trunk and/or hood. The at least one fluid tube contains a fluid configured to expand in response to receiving light radiant energy or thermal energy. At least one fluid turbine is coupled with the at least one fluid tube and has blades configured to be rotated by the fluid. A generator converts kinetic energy from the rotation of the blades of the at least one fluid turbine to electrical energy stored in the battery. Valves and/or pumps may control the fluid flow for enhancing generation of electrical energy using light radiant energy, thermal energy and/or kinetic energy.

17 Claims, 7 Drawing Sheets

(52) U.S. Cl.
CPC .... *B60K 2016/003* (2013.01); *B60K 2704/00* (2013.01); *F05B 2220/708* (2013.01); *F05B 2240/40* (2013.01); *F05B 2240/941* (2013.01); *Y02E 10/28* (2013.01); *Y02E 10/46* (2013.01)

(56) References Cited

U.S. PATENT DOCUMENTS

| | | | |
|---|---|---|---|
| 4,094,377 A | 6/1978 | Biggs | |
| 4,658,599 A | 4/1987 | Kajiwara | |
| 5,081,912 A * | 1/1992 | Clenet | B60H 1/248 114/212 |
| 6,066,372 A | 5/2000 | Miles | |
| 7,104,348 B2 | 9/2006 | Fasanello, Jr. | |
| 9,481,241 B2 * | 11/2016 | Jackson | B60K 11/02 |
| 2002/0153178 A1 | 10/2002 | Limonius | |
| 2008/0100258 A1 * | 5/2008 | Ward | H01M 10/465 320/101 |
| 2008/0271934 A1 * | 11/2008 | Kaufman | B60K 6/12 180/2.2 |
| 2009/0250276 A1 | 10/2009 | Goodwin et al. | |
| 2010/0005802 A1 | 1/2010 | Francis | |
| 2010/0024804 A1 * | 2/2010 | Chiu | F24D 11/003 126/640 |

FOREIGN PATENT DOCUMENTS

| | | |
|---|---|---|
| WO | WO 2008/114266 | 9/2008 |
| WO | WO2010134764 | 11/2010 |

OTHER PUBLICATIONS

Website: http://www.toyotamcdonoughparts.com/showAssembly.aspx?ukey_product=43140601&ukey_assembly=5757713; Accessed Sep. 30, 2015; 2 pages.

Website: http://www.mpoweruk.com/hydro_power.htm; Hydroelectric Power Generation; Accessed Sep. 30, 2015; 6 pages.

Website: http://auto.howstuffworks.com/fuel-efficiency/vehicles/solar-powered-vehicle-possibility2.htm; Jamie Page Deaton; Are solar-powered vehicles still a possibility?; Accessed Sep. 30, 2015; 3 pages.

Website: http://www.engineeringtoolbox.com/boiling-points-fluids-gases-d_155.html; Boiling Points Fluids and Gases; Accessed Sep. 30, 2015; 9 pages.

Mohamed Bentrcia; Design and Performance Analysis of an Automobile—Removable Solar System for Water and Cabin Heating; Mar. 2014; 11 pages.

Dileep Singh; Thermal Control of Power Electronics of Electric Vehicles with Small Channel Coolant Boiling; 24 pages.

* cited by examiner

FLUID TURBINE SYSTEMS FOR HARNESSING LIGHT RADIANT ENERGY, THERMAL ENERGY AND KINETIC ENERGY IN VEHICLES AND METHODS OF OPERATING THEREOF

BACKGROUND

Field

The present disclosure relates to fluid turbine systems for harnessing light radiant energy, thermal energy and/or kinetic energy in vehicles and methods of operating the fluid turbine systems for enhancing energy generation.

Description of the Related Art

With increasing global energy prices and growing environmental concerns regarding fuel emissions, vehicle manufacturers have sought to harness and regenerate various forms of renewable energy. For example, hybrid and electric vehicles can convert the kinetic energy during deceleration of the vehicle to electrical energy stored in a battery. The stored electrical energy can be utilized to propel movement of the vehicle or power an operation of an auxiliary device such as the HVAC (Heating, Ventilating and Air Conditioning) system. However, a significant portion of the kinetic energy is not harnessed in part because regenerative braking operates solely or primarily during deceleration of the vehicle and is most efficient at certain vehicle speed ranges.

Vehicle manufacturers have also attempted to harness solar energy using solar panels. Although solar panels can be utilized to convert solar energy or load to electrical energy stored in a battery, the stored energy may not be sufficient to propel movement of a vehicle and/or power auxiliary devices. Furthermore, utilizing solar panels in vehicles has been cost prohibitive in certain applications.

Thus, there is a need in the art for a cost-effective system that is configured to effectively and dynamically harness light radiant energy, thermal energy and/or kinetic energy of a vehicle in order to power vehicle operations using the harnessed energy.

SUMMARY

The present invention relates to a cost-effective fluid turbine system configured to effectively harness light radiant energy, thermal energy and/or kinetic energy of a vehicle. The system includes at least one fluid tube having at least a portion positioned proximal to the vehicle's top surfaces such as the roof, top surface of the trunk and/or the hood. The fluid in the fluid tube is configured to expand in response to receiving light radiant energy or thermal energy from light exposure to the top surfaces. The system further includes at least one fluid turbine coupled with the fluid tube and having blades that are rotated by the fluid. A generator converts the kinetic energy from rotation of the blades to electrical energy stored in the battery. An advantage of the present invention is that the energy cost of using the vehicle is significantly decreased because the vehicle would require less re-fueling and/or re-charging of the battery using an external power source. Furthermore, the kinetic energy of the vehicle (e.g., from a change in acceleration) advantageously results in sloshing of the fluid and further contributes to the generation of electrical energy. Another advantage of the system is that it includes relatively non-complex mechanical components that can be incorporated within the existing structure of a vehicle in a cost-effective implementation.

In an exemplary embodiment, the fluid turbine system may include upper fluid tubes positioned at a first height near the top surfaces and lower fluid tubes positioned at a second height less than the first height (e.g., at a bottom portion of the vehicle). An electronic control unit (ECU) may advantageously enhance generation of electrical energy using light radiant energy, thermal energy and/or kinetic energy by controlling the fluid flow using valves and/or pumps coupled with the upper fluid tubes and/or the lower fluid tubes.

The ECU may promote the fluid flow between the upper fluid tubes and the lower fluid tubes using valves and/or pumps when an estimated amount of electrical energy that can be generated using light radiant/thermal energy is greater than a first threshold value. The ECU may further promote the fluid flow within the lower fluid tubes and/or within the upper fluid tubes using valves/pumps when an estimated amount of electrical energy that can be generated using kinetic energy is greater than a second threshold value. An advantage of the system of the present invention is that the fluid turbine system dynamically enhances harnessing of light radiant energy, thermal energy and/or kinetic energy based on detected data/parameters.

Therefore, the systems of the present invention provide a cost-effective solution for dynamically enhancing harnessing of light radiant energy, thermal energy and/or kinetic energy of a vehicle.

BRIEF DESCRIPTION OF THE DRAWINGS

Other systems, methods, features and advantages of the present invention will be apparent to one skilled in the art upon examination of the following figures and description. Drawings are not necessarily to scale and may be exaggerated to better illustrate features of the invention. The first digit of each reference number generally indicates the drawing in which the element/feature appears. The other digits and/or characters that are common in different drawings relate to elements/features having certain similar characteristics.

DETAILED DESCRIPTION

The present invention relates to a cost-effective fluid turbine system configured to effectively harness light radiant energy, thermal energy, and/or a vehicle's kinetic energy. The system includes at least one fluid tube having at least a portion positioned proximal to the vehicle's top surfaces such as the roof, top surface of the trunk and/or the hood. The fluid in the fluid tube is configured to expand in response to receiving thermal energy or light radiant energy from light exposure of the top surfaces. The system further includes at least one fluid turbine coupled with the fluid tube. The fluid turbine has blades that are rotated by the fluid. A generator converts the kinetic energy from rotation of the blades to electrical energy stored in the battery. An advantage of the present invention is that the energy cost of using the vehicle is significantly decreased because the vehicle would require less re-fueling and/or re-charging of the battery using an external power source. Furthermore, the kinetic energy of the vehicle (e.g., from a change in acceleration) advantageously results in sloshing of the fluid and further contributes to generation of electrical energy. Another advantage of the system is that it includes relatively non-complex mechanical components that can be incorporated within the existing structure of a vehicle in a cost-effective implementation.

In an exemplary embodiment, the fluid turbine system includes upper fluid tubes positioned at a first height near the top surfaces and lower fluid tubes positioned at a second height less than the first height (e.g., a bottom portion of the vehicle). An electronic control unit (ECU) advantageously enhances generation of electrical energy using light radiant energy, thermal energy, and/or the vehicle's kinetic energy by controlling the fluid flow using valves and/or pumps. The ECU may promote the fluid flow between the upper fluid tubes and lower fluid tubes using valves and/or pumps when an estimated amount of electrical energy that can be generated using light radiant/thermal energy is relatively high (e.g., greater than a first threshold value). The ECU may further promote flow within the lower fluid tubes and/or within the upper fluid tubes using valves/pumps when an estimated amount of electrical energy that can be generated using kinetic energy is relatively high (e.g., greater than a second threshold value). A unique advantage of the system of the present invention is that the fluid turbine system dynamically enhances harnessing of light radiant energy, thermal energy, and/or kinetic energy based on detected data/parameters.

Figure 1:
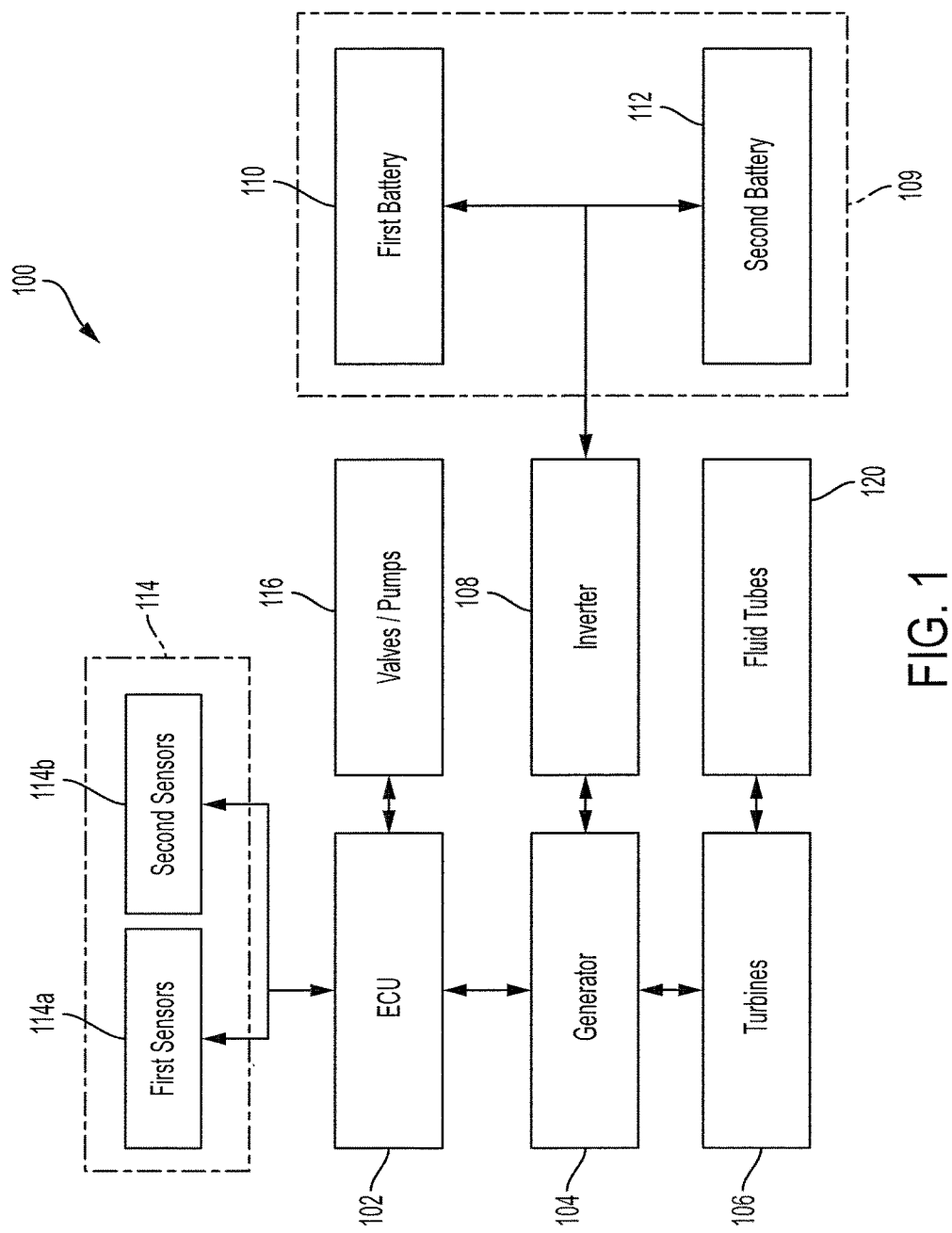
FIG. 1 is a block diagram of certain components of a vehicle for generating electrical energy using fluid turbines, according to an aspect of the present invention.

The discussion now turns to interaction of certain elements of a vehicle 100, as shown in the block diagram of FIG. 1, for generating electrical energy using a fluid turbine system. The vehicle 100 includes at least one fluid tube 120 coupled with at least one fluid turbine 106. A "tube" as used hereinafter refers to a substantially cylindrical fluid transfer structure, a fluid transfer structure with a non-circular cross-section, a fluid loop with a serpentine or other shape, and/or various other types, shapes or forms of channels for allowing fluid flow. At least a portion of the fluid tube 120 is positioned proximal to top surfaces of the vehicle 100, for increasing exposure to light radiant/thermal energy from an external light/heat source.

The external light/heat source may be the sun, a heat lamp, a radiation source, and/or any other light, radiation or heat source capable of emitting heat/radiation that can be harnessed. Hereinafter, harnessing solar load/energy is discussed without specifying in each instance other types of thermal or light radiant energy because solar energy/load is most often the predominant and/or significant portion of available light radiant/thermal energy. One of ordinary skill in the art would appreciate that the fluid turbine systems described hereinafter can be used to harness light radiant energy and/or thermal energy from other sources of radiation or heat without limiting the scope of the present invention.

The fluid is configured to expand in response to receiving light radiant energy or thermal energy. As a result, the fluid flows through the fluid tube 120 and drives blades of the fluid turbines 106. The fluid turbine 106 may have a central hub connected to the blades, similar in this respect to the structure of a water turbine used for electrical power generation in other applications. The central hub may translate the rotational force of the blades to a shaft of the generator 104 via a rotating shaft, planetary gears and/or various other rotating connection links. The shape, number, weight and/or structure of the blades can be designed or modified to enhance generation of electrical energy using the fluid flow.

The generator 104 converts the kinetic energy from rotation of the fluid turbines 106 into electrical energy stored in the one or more batteries 109 (e.g., the first battery 110 and/or the second battery 112). The generator 104 may be positioned proximal to the fluid turbine 106 or may alternatively be positioned in a more remote part of the vehicle 100. The generator 104 may be a dual purpose motor-generator (M-G) that can operate in a motor mode or a generator mode. Alternatively, a separate motor can be provided to propel movement of blades of the fluid turbines 106. When a motor or M-G is provided, the flow of the fluid tube may be controlled using the motor or M-G in addition to or as an alternative to use of valves or pumps.

The generator 104 may output AC voltage/current, and therefore an inverter 108 can be utilized to convert the output to DC voltage/current that can be stored as electrical energy in the one or more batteries 109. The stored electrical energy can be utilized to propel wholly or in part a movement of the vehicle 100 or to power an auxiliary device of the vehicle 100. Accordingly, the invention advantageously allows light radiant energy or thermal energy to be harnessed and re-used for powering various types of vehicle operations.

In order to ensure that the fluid expands sufficiently to drive the turbine blades in response to receiving thermal/light radiant energy, a fluid with a significantly high volumetric thermal expansion coefficient can be utilized. The volumetric coefficient of expansion $\alpha_V$ is defined as $\alpha_V = 1/V(\partial V/\partial T)_P$, where V is the volume, T is the temperature, subscript V indicates that the expansion is volumetric, and subscript P indicates that the pressure is held constant. It would be advantageous for the fluid to have high volumetric thermal expansion particularly when exposed to typical solar energy/load, which may be for example, greater than or equal to 400 W/m². The fluid may also have a low boiling point to enhance the fluid flow in the fluid tube 120. For example, the fluid may have a boiling point that is less than 70 degrees Celsius (° C.)/158 degrees Fahrenheit (° F.). The fluid may include one or a combination of the following fluids: Freon refrigerant R-11, Ether or Diethyl Ether, Pentane-n, Ethyl bromide C2H3Br, Methylene Chloride (CH2Cl2, dichloromethane), Methyl iodide, Carbon disulfide CS2, Carbon bisulfide, Carbon bisulfide, Methyl acetate, Bromine, Chloroform, and/or Hexane-n. The foregoing list of fluids is provided as non-limiting examples of low-boiling point fluids. Other fluids capable of flowing through the fluid tube system in response to receiving light radiant and/or thermal energy can be utilized, without limiting the scope of the present invention. Because the fluid is used in the vehicle 100, the fluid is ideally selected and/or modified to be substantially non-flammable, non-combustible and non-hazardous under certain operating conditions.

The systems of the present invention can be implemented in a hybrid vehicle, conventional engine-operated vehicle, an electric vehicle, a plug-in hybrid vehicle and/or other vehicles. The one or more batteries 109 may include a first battery 110 and/or a second battery 112. The first battery 110 may be the primary one or more batteries of a hybrid or electric vehicle 100. The second battery 112 may be a separate battery utilized for storing energy generated by the fluid turbines 106. In an embodiment, the first battery 110 and the second battery 112 can be used for storing the generated electrical energy. If one of the batteries 110 or 112 reaches a full state of charge, the overflow energy can be directed to be stored in the other battery that is capable of being charged. Although both batteries are shown in FIG. 1, in other embodiments, only the first battery 110 or only the second battery 112 can be utilized for storing energy generated by the fluid turbine 106.

The vehicle 100 includes an ECU 102 connected to valves/pumps 116, sensors 114 and/or a generator 104. Connection to the valves/pumps 116 and/or the generator 104 may be direct or indirect via controllers, actuators and/or other devices or units. As described below in further details with respect to FIGS. 3A-6, the first one or more sensors 114a detect first data/parameters indicative of an amount of available light radiant energy or thermal energy and particularly, solar load/energy. The second one or more sensors 114b detect second data/parameters indicative of an amount of available kinetic energy of the vehicle 100. Based on the detected data/parameters, the ECU 102 can control the flow of the fluid in the fluid tubes 120 using valves and/or pumps 116, as described in further details below with respect to FIGS. 5 and 6.

The ECU 102 may be the engine control unit of the vehicle. The ECU 102 may alternatively be a separate electronic control unit having one or more processors directed to managing primarily or solely the operation of the fluid turbine system. The one or more processors can be integrated circuits used for controlling vehicle operations, such as the operations of the valves/pumps 116 and/or the motors. The ECU 102 may be connected to a memory that includes codes or instructions (such as look-up tables) for operations of the ECU 102 based on the detected parameters. Alternatively, more than one electronic control unit may operate in conjunction with one another to manage the operations of the generator 104.

Figure 2A:
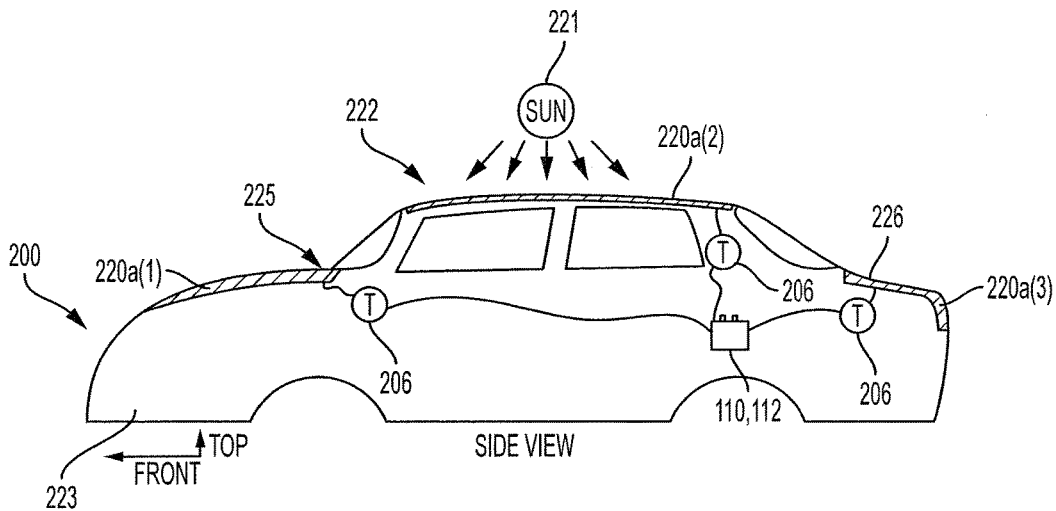
FIG. 2A is a schematic side view of a vehicle having fluid tubes near top vehicle surfaces for generating electrical energy, according to an aspect of the present invention.

FIG. 2A is a side view of a vehicle 200 having upper fluid tubes 220a positioned on top surfaces of the vehicle 200 to absorb light radiant energy and/or thermal energy from an external light source such as the sun 221. Hereinafter, the term "fluid tubes" may collectively refer to one or more fluid tubes of the system, some or all of which may be connected to one another. The term "upper fluid tube" refers to a fluid tube positioned proximal to one or more of top surfaces of the vehicle 200. The top surfaces of the vehicle's body portion 223, such as the hood 225, the roof 222 and/or the top surface or lid of the trunk 226, are most likely to be exposed to light radiant energy and/or thermal energy (particularly solar energy or load). Hereinafter, a reference numeral collectively refers to illustrated items in drawings having reference numerals with additional characters/numbers. For example, "upper fluid tubes 220a" collectively refers to the first upper fluid tube 220a(1), the second upper fluid tube 220a(2) and the third upper fluid tube 220a(3). The first upper fluid tube 220a(1) may be positioned on the hood 225, the second upper fluid tube 220a(2) may be positioned at or underneath the roof 222 and the third upper fluid tube 220a(3) may be positioned on the trunk 226.

In the configuration shown in FIG. 2A, there are multiple fluid turbines 206, at least one for each upper fluid tube 220a. The fluid flow may increase as a result of receiving light radiant/thermal energy, which is high when the roof 222, trunk 226 and/or hood 225 are exposed to a high solar load/energy (e.g., greater than 500 W/m²). Furthermore, as the acceleration of the vehicle 200 changes (such as by starting/stopping in traffic, or accelerating/decelerating while travelling on the road), the kinetic energy of the vehicle 200 causes sloshing of the fluid in the upper fluid tubes 220a. "Sloshing" herein refers to movements of the fluid in fluid tubes (e.g., the upper fluid tubes 220a) in one or more directions as a result of kinetic energy of the vehicle 200. The kinetic energy may be longitudinal, lateral, diagonal, and/or along other directions across the vehicle 200. As a result of the sloshing effect, the fluid flow drives blades of the fluid turbines 206. The generator 104 converts the kinetic energy to electrical energy stored in the first battery 110 and/or the second battery 112, as described above with respect to FIG. 1. Therefore, the present invention advantageously enhances harnessing light radiant energy, thermal energy, and/or the kinetic energy of the vehicle 200.

FIG. 2A does not show fluid connections between the first upper fluid tube 220a(1), the second upper fluid tube 220a(2) and the third upper fluid tube 220a(3). Two or more of the first upper fluid tube 220a(1), the second upper fluid tube 220a(2) and the third upper fluid tube 220a(3) may be fluidly coupled with one another to form a single fluid tube fluidly coupled with the one or more fluid turbines 206. An advantage of connecting the fluid tubes is that an overall amount of fluid flow can be enhanced, thereby increasing the overall amount of electrical energy that can be generated using the fluid flow. The present invention is not limited to the shown configuration in which three exemplary fluid tubes are utilized. A single fluid tube (e.g., on the roof 222) may be utilized along with one or more fluid turbines 206. Two, four, or other numbers of fluid tubes and fluid turbines may be utilized based on design and cost concerns, without limiting the scope of the present invention.

Figure 2B:
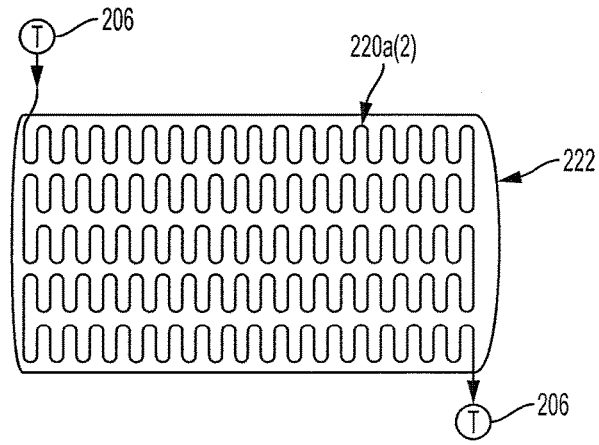
FIG. 2B is a schematic bottom view of fluid tubes positioned underneath the vehicle's roof, according to an aspect of the present invention.
Figure 2C:
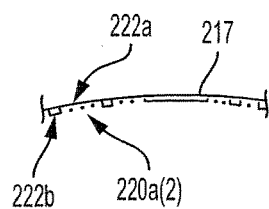
FIG. 2C is a schematic side view of fluid tubes positioned around reinforcements of the vehicle's roof, according to an aspect of the present invention.

FIGS. 2B and 2C show an example of the structure and positioning of the second upper fluid tube 220a(2) proximal to the roof 222. FIG. 2B shows a bottom view of the roof 222. The second upper fluid tube 220a(2) may have a serpentine shape and positioned underneath the top surface of the roof 222. The second upper fluid tube 220a(2) is connected to fluid turbines 206. FIG. 2C is a side view of the second upper fluid tube 220a(2) routed around roof reinforcements 222b and sun/moon roof 217. Other fluid tubes can be installed in open spaces between reinforcements and other existing vehicle structures without requiring significant structural changes to the vehicle 200. Therefore, another advantage of the system is that it includes non-complex mechanical components that can be incorporated within the existing structure of a vehicle in a cost-effective implementation.

Figure 3A:
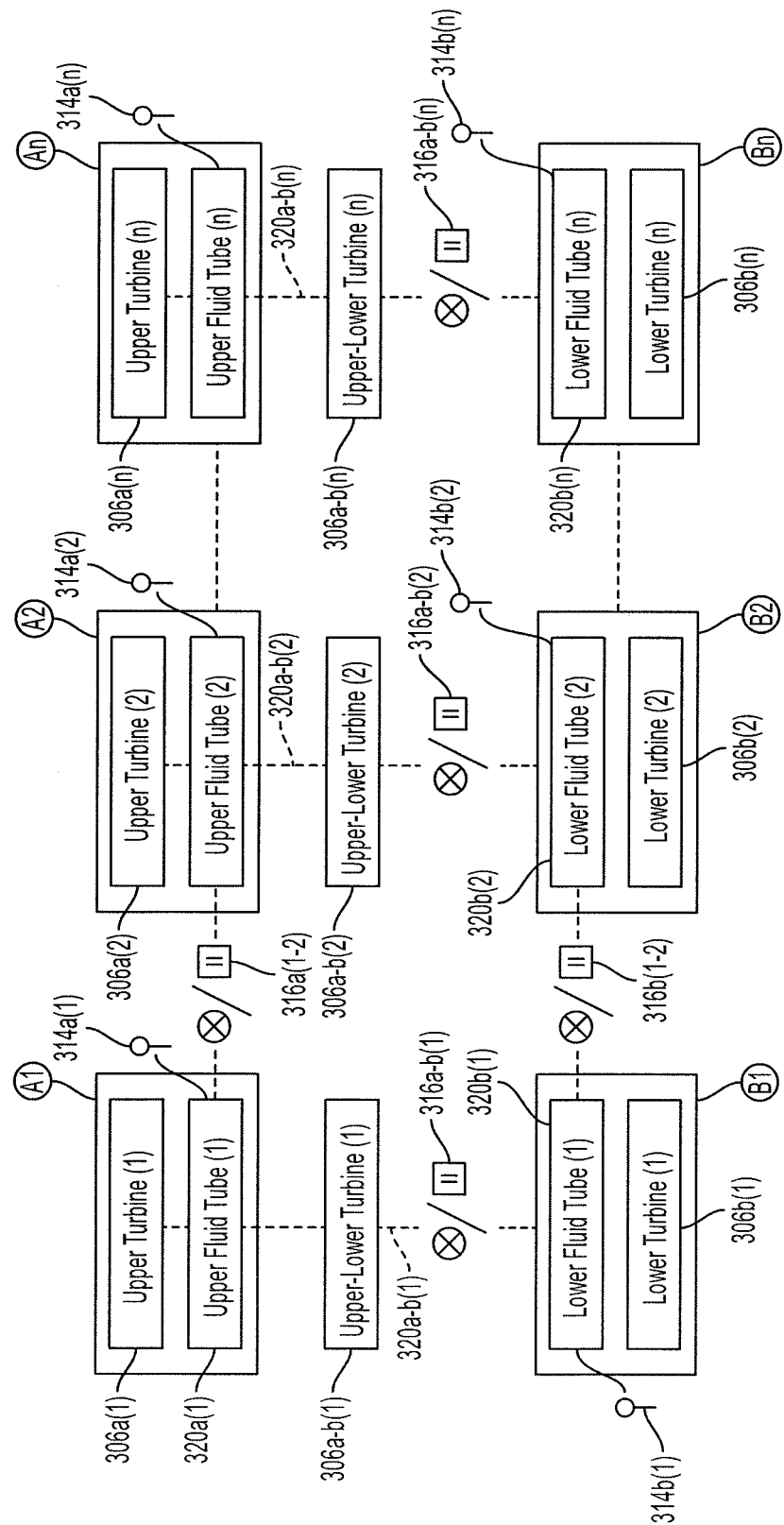
FIG. 3A is a block diagram of a fluid turbine system for controlling energy generation using upper fluid tubes and lower fluid tubes, according to an aspect of the present invention.

As described above, FIGS. 2A-2C illustrate certain embodiments in which the upper fluid tubes 220a are positioned near top surfaces exposed to solar light. The discussion now turns to structural components of a fluid turbine system having upper fluid tubes and lower fluid tubes. FIG. 3A is a block diagram of an exemplary implementation of the fluid turbine system for harnessing light radiant energy, thermal energy, and/or the vehicle's kinetic energy.

As will be apparent from description of FIGS. 3A-4 below, character (A) or "a" when used with a reference numeral, refers to fluid tubes, valves, pumps, fluid turbines and/or other parts positioned in or near upper portions of the vehicle 300. Similarly, character (B) or "b" refers to such parts positioned in or near lower portions of the vehicle 300. For ease of reference, an "array" as used herein refers to upper or lower grouping of the fluid tubes and related components such as pressure sensors, turbines, and/or pumps/valves, without limiting the structure of the fluid tubes to any particular arrangement. The upper fluid array (A) and/or the lower fluid array (B) may have "n" number of fluid tubes. The number "n" can differ based on design concerns and/or cost considerations. Although the fluid tubes are listed from 1 through "n" for both the upper fluid tubes 320a and the lower fluid tubes 320b, it can be appreciated that there may be less or more number of fluid tubes and related components in the upper fluid array than in the lower fluid array.

The fluid turbine system includes a plurality of fluid tubes 320, two or more of which can be fluidly coupled with one another. The fluid flow between the upper fluid tubes 320a (numbered from 1 through n) can be selectively controlled via upper pumps and/or valves 316a. For example, the fluid flow between the first upper fluid tube 320a(1) and the second upper fluid tube 320a(2) can be controlled using the first upper pump/valve 316a(1-2). Similar upper pumps/valves 316a can be provided between two or more of the remaining upper fluid tubes 320a. Similarly, the fluid flow between the lower fluid tubes 320b can be selectively controlled via lower pumps and/or valves 316b (e.g., the pump/valve 316b(1-2) positioned between the first lower fluid tube 320b(1) and the second lower fluid tube 320b(2)).

The fluid flow between the upper fluid tubes 320a and the lower fluid tubes 320b can be controlled using upper-lower pumps/valves 316a-b (such as 316a-b(1), 316a-b(2), ..., 316a-b(n)). "a-b" or the term "upper-lower" refers to fluid turbines, pumps/valves, and/or other parts positioned between the upper fluid tubes 320a and lower fluid tubes 320b. Upper fluid tubes 320a and lower fluid tubes 320b may be connected via one or more upper-lower fluid tubes 320a-b(1), 320a-b(2), ... 320a-b(n). One or more of the upper-lower fluid tubes 320a-b may be fluidly coupled with one or more upper-lower fluid turbines 306a-b(1), 306a-b(2), ... 306a-b(n).

Each upper fluid tube 320a or lower fluid tube 320b may have a corresponding upper fluid tube pressure sensor 314a or lower fluid tube pressure sensor 314b, respectively. The detected pressure data allows the system to monitor the fluid flow in the upper fluid tubes 320a and/or the lower fluid tubes 320b. The ECU 102 can control the fluid flow, if needed, based on the detected pressure at one or more junctures/points of the fluid turbine system to enhance energy generation. It can be appreciated that less or more upper/lower fluid tube pressure sensors 314a/314b can be utilized. For example, a less or lower number of upper fluid tube pressure sensors 314a may be sufficient for an adequate understanding of the flow within the upper fluid tube 320a. Similarly, although a fluid turbine 306 is shown for each fluid tube 320, less or more fluid turbines 306 can be utilized. For example, two or more fluid tubes 320 may be connected to a single fluid turbine 306 for storing electrical energy in the one or more batteries 309.

Figure 3B:
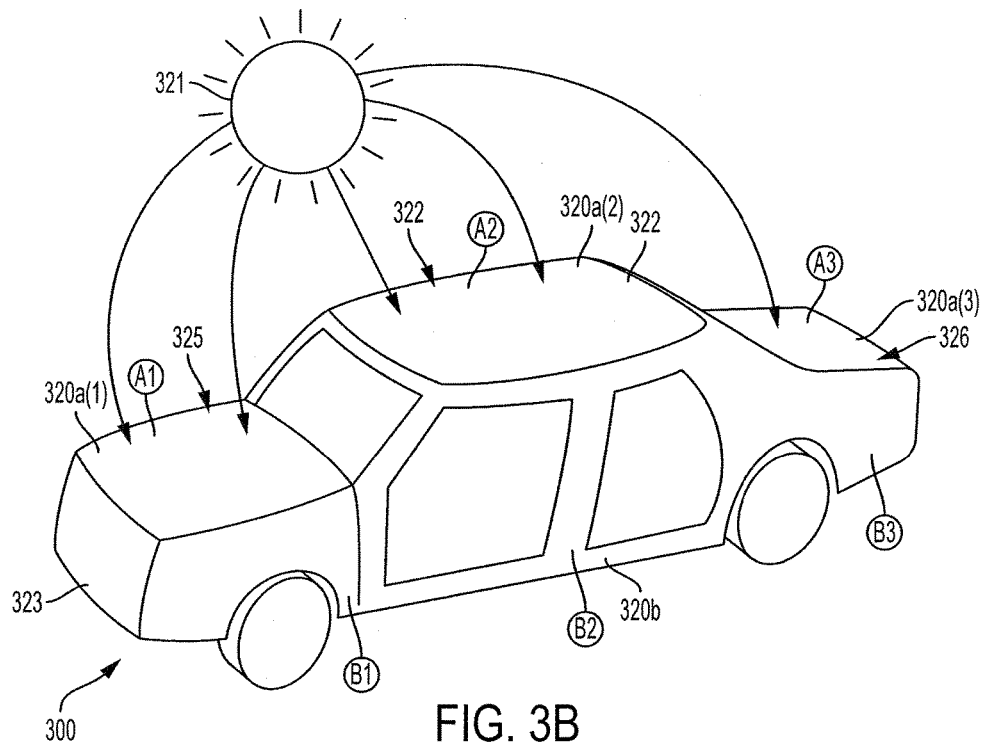
FIG. 3B is a schematic isometric view of a vehicle having upper fluid tubes and lower fluid tubes for generating electrical energy using light radiant energy, thermal energy, and/or kinetic energy, according to an aspect of the present invention.

FIG. 3B is a schematic view of a vehicle 300 having upper fluid tubes 320a and lower fluid tubes 320b, respectively. First upper fluid tubes 320a(1), second upper fluid tube 320a(2) and/or third upper fluid tube 320a(3) can be positioned proximal to the hood 325, roof 322 and/or trunk 326, respectively, as discussed above regarding FIGS. 2A-C.

Figure 3C:
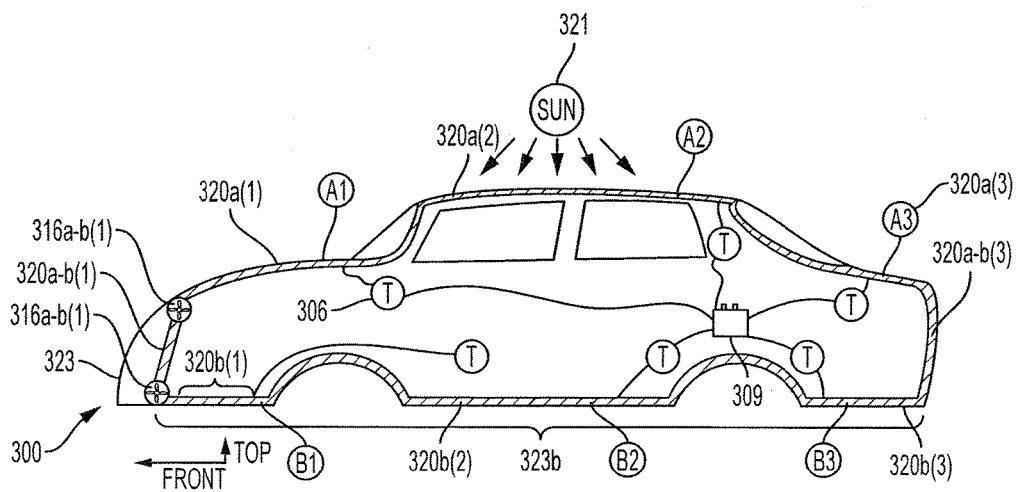
FIG. 3C is a schematic side view of a vehicle having upper fluid tubes and lower fluid tubes for generating electrical energy, according to an aspect of the present invention.

The upper fluid tubes 320a and the lower fluid tubes 320b can be fluidly coupled with one another to form a single fluid tube, as shown in FIG. 3C. The upper fluid tubes 320a and/or the lower fluid tubes 320b may be fluidly coupled with one or more fluid turbines 306 (denoted by encircled "T") for generating electrical energy. Fluidly coupling all or substantially all fluid tubes, when possible, is advantageous because the potential for energy generation is enhanced when the overall flow potential is increased. The upper fluid tubes 320a may be fluidly coupled with the lower fluid tubes 320b, for example, by upper-lower fluid tubes 320a-b(1) and 320a-b(3).

The lower fluid tube 320b may include the first lower fluid tube 320b(1), the second lower fluid tube 320b(2) and the third lower fluid tube 320b(3) that are positioned proximal to a front, middle and rear portion, respectively, of an underbody panel 323b of the body portion 323. In addition or alternatively, the lower fluid tube 320b may be positioned near side surfaces of the vehicle 300 and/or any other part of the vehicle 300 at a height less than that of the upper fluid tubes 320a.

The ECU 102 may control the fluid flow between the upper fluid tubes 320a and the lower fluid tubes 320b using the first upper-lower valves/pumps 316a-b(1). The flow in the upper fluid tube 320a, in the lower fluid tube 320b, and/or between the upper fluid tubes 320a and the lower fluid tubes 320b can be further controlled using additional valves/pumps 316 or other flow control mechanisms. As explained above with respect to FIG. 1, a motor can be utilized to power rotation of the fluid turbines 306 if needed to assist in control of the flow of the fluid.

Figure 3D:
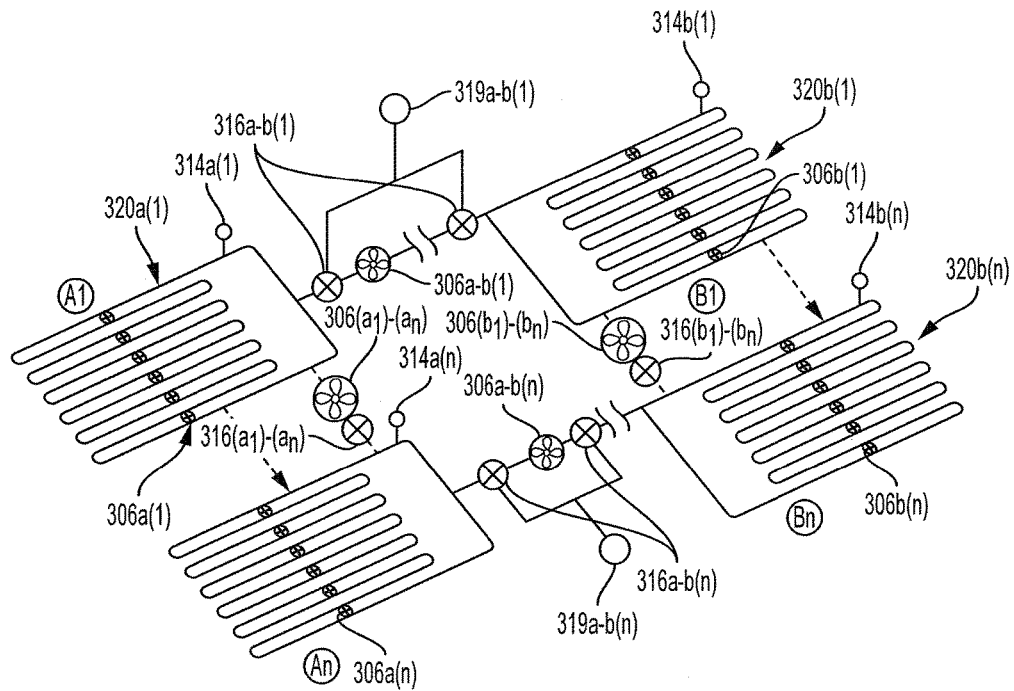
FIG. 3D is a schematic view of a fluid turbine system having upper fluid tubes and lower fluid tubes for generating electrical energy, according to an aspect of the present invention.

FIG. 3D is a schematic diagram of the fluid turbine system having upper fluid tubes 320a and lower fluid tubes 320b for generating electrical energy, according to an aspect of the present invention. Each array of upper fluid arrays A(1), A(2), ... A(n) and/or lower fluid arrays B(1). B(2), ... B(n) may have corresponding in-line fluid turbines 306. The fluid flow between the upper fluid tubes 320a and the lower fluid tubes 320b can be controlled using valves/pumps 316. For example, the fluid flow between the first upper fluid tube 320a(1) and the first lower fluid tube 320b(1) can be controlled using the first upper-lower valve/pump 316a-b(1). The terms "first," "second," etc. are used herein to distinguish between locations at which the fluid tubes 320 are positioned, similar to the way the terms were used above with respect to FIG. 2A. A controller and/or actuator 319a-b(1) can be connected to the ECU 102 for allowing the ECU 102 to control opening/closing of the first upper-lower valves 316a-b(1). Alternatively or in addition, a pump can be used to control the flow, if needed.

The discussion now turns to the operation of the fluid turbine systems discussed above. Referring to FIGS. 3A-3D, as a solar load (denoted by arrows from the sun 321) is applied to the exterior surfaces of the vehicle 300, the ultraviolet radiation and thermal energy cause the exterior surfaces of the vehicle 300 to heat up. The hood 325, the roof 322 and the trunk 326 are typically heated the most due to having planar surfaces with direct exposure to the solar load. The upper fluid tubes 320a (including 320a(1), 320a(2) and/or 320a(3)) are sandwiched between vehicle structures underneath the top exterior surfaces of the hood 325, roof 322 and/or trunk 326. As a result, the fluid in the upper fluid tubes 320a absorbs the light radiant energy or thermal energy, and its pressure increases in the upper portions. The fluid flows from the upper fluid tubes 320a to the lower fluid tubes 320b and drives blades of one or more fluid turbines 306. The fluid turbines 306 are connected to one or more generators 104, which convert the kinetic energy of the fluid turbines 306 to electrical energy stored in the one or more batteries 109.

After the fluid flows from the upper fluid tubes 320a to the lower fluid tubes 320b, the pressure differential may eventually stabilize. During exposure to intense sunlight, the fluid may flow from the upper fluid tubes 320a to the lower fluid tubes 320b. The fluid pressure differential may stabilize when the vehicle 300 is parked overnight without high exposure to solar light. As a result, a portion of the fluid flows back from the lower fluid tubes 320b to the upper fluid tubes 320a. Under certain conditions, stabilization may not occur adequately, for example, if the fluid pressure differential is high due to the height difference between the upper fluid tubes 320a and the lower fluid tubes 320b and/or due to other factors hindering a return to a stable condition or equilibrium state. In this case, the fluid turbine system can be reset or recharged (step 552) to return an amount of fluid from the lower fluid tubes 320b to the upper fluid tubes 320a. The resetting/recharging step (step 552) may be performed if the ECU 102 determines, based on data detected by the sensors 114, that excessive fluid transfer has occurred from the upper fluid tubes 320a to the lower fluid tubes 320b and/or sufficient fluid has not returned from the lower fluid tubes 320b to the upper fluid tubes 320a.

Figure 4:
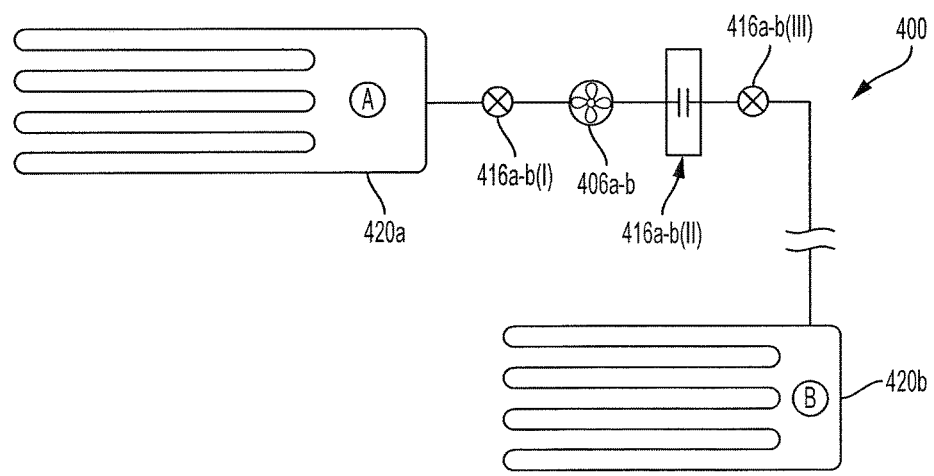
FIG. 4 is a schematic view of a fluid turbine system having one or more resetting valves/pumps for controlling fluid flow between the upper fluid tubes and the lower fluid tubes, according to an aspect of the present invention.

FIG. 4 shows a resetting/recharging system for returning a portion of the fluid from the lower fluid tubes 420b to the upper fluid tubes 420a. The upper-lower fluid turbine 406a-b is positioned between the upper fluid tubes 420a and the lower fluid tubes 420b. The upper-lower fluid turbine 406a-b may generate energy when the fluid flows from the upper fluid tubes 420a to the lower fluid tubes 420b and/or when the fluid flows from the lower fluid tubes 420b to the upper fluid tubes 420a (e.g., during stabilization and/or resetting/recharging). The ECU 102 may control a pump 416a-b(II) to pump the fluid from the lower fluid tubes 420b to the upper fluid tubes 420a if the fluid does not naturally flow back up. In addition or alternatively, the ECU 102 may utilize one or more valves (e.g., 416a-b(I) and 416a-b(III)) to control resetting the flow of the fluid accordingly. Although a single pump between the upper fluid tubes 420a and the lower fluid tubes 420b is shown, it can be appreciated that one or more pumps and/or valves can be coupled with one or more of the upper fluid tubes 420a and/or the lower fluid tubes 420b in order to further facilitate the movement of the fluid.

Figure 5:
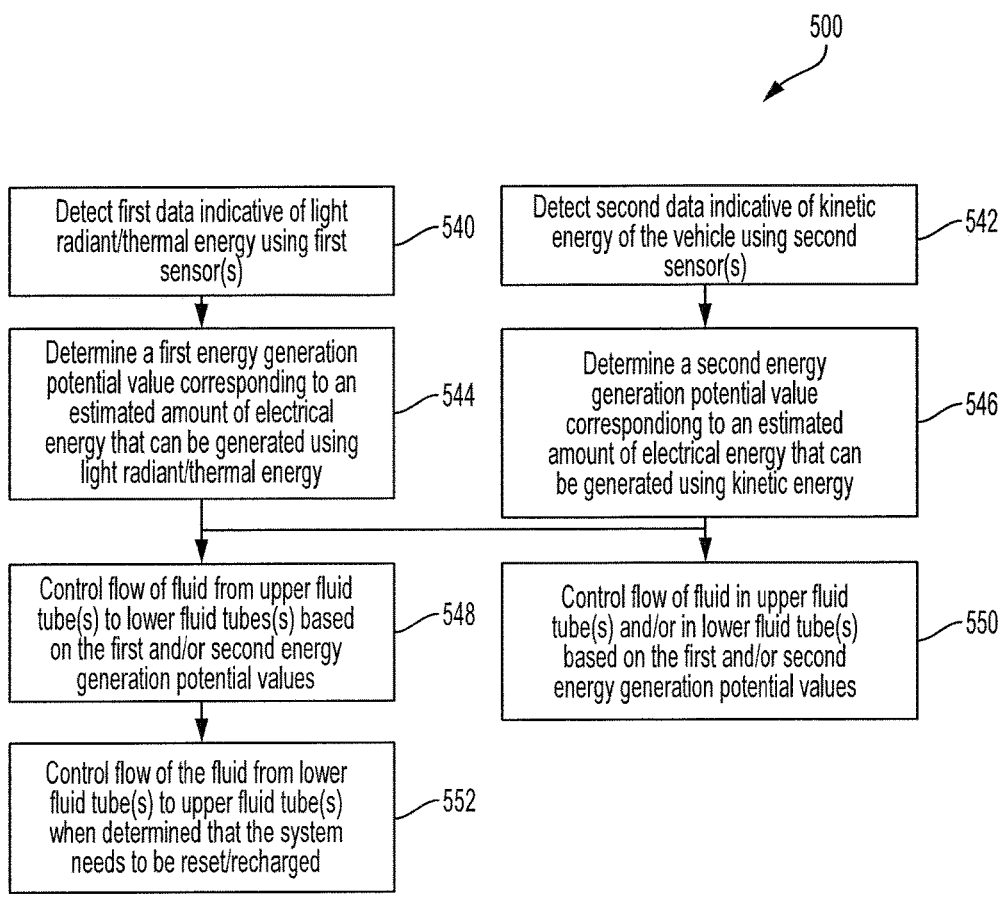
FIG. 5 is a flowchart diagram of a method of operating a fluid turbine system in a vehicle for enhancing generation of electrical energy, according to an aspect of the present invention.

FIG. 5 is a flowchart diagram of a method 500 of operating a fluid turbine system for enhancing harnessing of light radiant energy, thermal energy, and/or kinetic energy.

The first one or more sensors 114a detect first data indicative of available light radiant energy or thermal energy (step 540). The first one or more sensors 114a may include a solar load or energy sensor. A solar load or energy sensor as used herein may be any sensor configured to detect available solar load, energy and/or power (e.g., in terms of Watts/meters square or $W/m^2$) from current exposure to sunlight. The solar load/energy sensor may be positioned proximal to the top surfaces of the vehicle (e.g., the roof, trunk and/or hood). In addition or alternatively, a light sensor may be utilized for estimating light radiant energy/intensity.

Alternatively or in addition, an ambient temperature sensor may be used to determine the available thermal energy. An ambient temperature sensor does not necessarily provide the same data that a solar load or energy sensor provides. Sunlight exposure may not be high in certain geographical areas despite a high ambient temperature. Other sensors capable of estimating an amount of available light radiant energy or thermal energy can be utilized. Data detected by the pressure sensors discussed above may be considered in estimating the available light radiant energy or thermal energy. A high pressure differential between upper and lower tubes may be indicative of high solar load/energy in certain conditions. Based on the first data, the ECU 102 determines a first energy generation potential value corresponding to an estimated amount of electrical energy that can be generated using light radiant/thermal energy (particularly solar radiant/thermal energy) (step 544).

Second one or more sensors 114b detect second data indicative of available kinetic energy of the vehicle (step 542). The kinetic energy is high when there is a great amount of acceleration/deceleration or turning, thereby causing sloshing of the fluid. Examples of these sensors are explained in further details below with respect to steps 662, 666, 670 and/or 672 of FIG. 6. Based on the second data, the ECU 102 determines a second energy generation potential value corresponding to an estimated amount of electrical energy that can be generated using kinetic energy (step 546).

Referring to FIGS. 3A-3D and 5, the ECU 102 controls the fluid flow from the upper fluid tubes 320a to the lower fluid tubes 320b based on the first and/or second energy generation potential values (step 548). When the first energy generation potential value is high, in absolute terms and/or in comparison with the second energy generation potential value, the ECU 102 may control the valves 316 to allow the fluid to flow from the upper fluid tubes 320a to the lower fluid tubes 320b. Energy generation can be high under such conditions because exposure of the upper fluid tubes 320a to the solar load causes a high pressure differential between the upper fluid tubes 320a and the lower fluid tubes 320b.

The ECU 102 controls the fluid flow in the upper fluid tubes 320a and/or in the lower fluid tubes 320b based on the first energy generation potential value and/or the second energy generation potential value (step 550). When the second energy generation potential value is high, in absolute terms and/or in comparison with the first energy generation potential value, the ECU 102 may control the upper-lower valves 316a-b to prevent fluid flow between the upper fluid tubes 320a and the lower fluid tubes 320b. The ECU 102 may open the upper fluid valves (e.g., 316a(1-2) in FIG. 3A) connecting the upper fluid tubes 320a with one another to promote flow of the fluid in the upper fluid tubes 320a. Similarly, the ECU 102 may open the lower fluid valves (e.g., 316b(1-2) in FIG. 3A) to promote flow of the fluid in the lower fluid tubes 320b.

The fluid flow between the upper fluid tubes 320a and the lower fluid tubes 320b may be reduced or blocked in order to enhance in-plane sloshing of the fluid as a result of in-plane acceleration and/or turning. This is desirable when the available solar load/energy is low because the flow reduction/blockage would not prevent a desirable energy generating top-down fluid flow. Therefore, an advantage of the present invention is that the ECU 102 can dynamically control the fluid flow to enhance energy generation using light radiant energy, thermal energy, and/or the vehicle's kinetic energy, based on detected data/parameters.

In step 552, if the fluid does not adequately return, the ECU 102 may control pumps/valves 316 to return a portion of the fluid from the lower fluid tubes 320*b* to the upper fluid tubes 320*a*, as discussed in details above with respect to FIG. 4.

Figure 6:
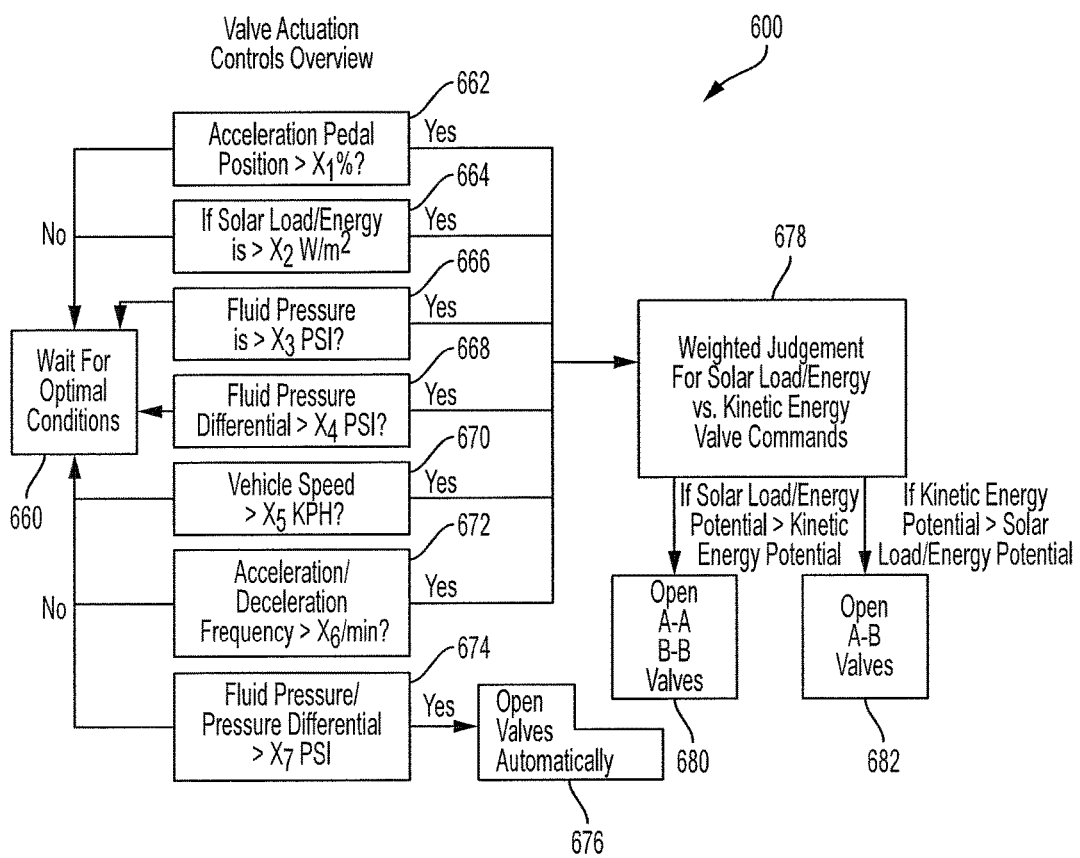
FIG. 6 is a flowchart diagram of an exemplary method of operating a fluid turbine system in a vehicle for enhancing generation of electrical energy, according to an aspect of the present invention.

FIG. 6 is a flowchart diagram of an exemplary method 600 of operating the fluid turbine system for enhancing generation of electrical energy using the light radiant energy, thermal energy, and/or the vehicle's kinetic energy. The ECU 102 may continuously monitor first and second data/parameters indicative of light radiant/thermal energy and kinetic energy (steps 662-672). The ECU 102 may wait for optimal conditions before controlling the fluid flow in order to enhance harnessing light radiant energy, thermal energy, and/or the vehicle's kinetic energy.

Optimal conditions may be when light radiant energy, thermal energy, and/or the vehicle's kinetic energy are expected to be above a threshold value. Operating the fluid turbine system during optimal conditions ensures that the generated energy would outweigh energy or cost associated with controlling the fluid. Otherwise, if the system operates under all conditions, there may be conditions under which the fluid flows from the upper fluid tubes 320*a* to the lower fluid tubes 320*b* over a prolonged period of time. Under such conditions, the fluid may not turn the turbine blades with sufficient force to generate a great amount of energy. Furthermore, a recharging/resetting (step 552) may be needed afterwards. As such, the fluid flow would be more efficiently used under conditions when the solar load or energy is high enough to drive or propel the rotation of the turbine blades with sufficient force.

In the non-limiting exemplary embodiment shown in FIG. 6, optimal conditions are determined to be present when any of the conditions in steps 662-672 are met. Alternatively, different combinations of parameters/data indicating the potential energy generation values can be evaluated without limiting the scope of the present invention.

In step 662, the ECU 102 determines that the available kinetic energy is optimal because the acceleration pedal is depressed more than an acceleration threshold value X1. X1 may be the acceleration pedal depression percentage (%) or value. When the driver requests a high amount of acceleration, there will be a great amount of longitudinal kinetic energy available, causing sloshing of the fluid. Alternatively or in addition, steering wheel sensor data can be used because a great amount of turning would similarly be indicative of high lateral kinetic energy. In addition or alternatively, a brake pedal depression percentage (%) or value can be analyzed to determine degree and/or frequency of deceleration.

In step 664, optimal conditions are met when the solar load or energy is greater than a threshold value X2, which may be in terms of W/m$^2$, as discussed above regarding steps 540 and 544 of FIG. 5. In step 666, the fluid pressure in one or more portions of the fluid turbine system can be detected and analyzed. If the fluid pressure exceeds a threshold value X3 (e.g., in terms of PSI), then optimal conditions are met. Alternatively or in addition, fluid pressure differential can be examined (e.g., in terms of PSI). The pressure and/or pressure differential may be indicative of light radiant energy, thermal energy, and/or the vehicle's kinetic energy. A pressure differential within an upper fluid tube or a lower fluid tube may be indicative of high kinetic energy potential, whereas a pressure differential between the upper fluid tube and the lower fluid tube may be indicative of high light radiant/thermal energy potential.

The vehicle speed can be determined using a vehicle speed sensor. If the speed is greater than a threshold value X5 (e.g., in terms of kilometers per hour or miles per hour), then the potential kinetic energy is determined to be optimal (step 670). Alternatively or in addition, the frequency of change of vehicle speed (or acceleration) can be compared with a threshold value. The acceleration can be determined using an inertial measurement unit configured to detect positioning, velocity or acceleration of the vehicle. The frequency of change in the vehicle speed may be more indicative of kinetic energy than the vehicle speed value. The kinetic energy may be low even when the vehicle speed is high (for example, when the vehicle is travelling on a highway for a prolonged period of time on cruise control). However, driving in city traffic with frequent starts and stops corresponds to a high amount of potential kinetic energy. Therefore, the frequency of change in the vehicle speed (or acceleration) can be assigned a relatively higher weight for determining the amount of available kinetic energy.

In step 672, the acceleration/deceleration frequency may be compared with a threshold value X6, which may be in terms of number of changes between acceleration and declaration within a time period (such as a minute). This can be determined based on speed of the vehicle, determined acceleration of the vehicle, a longitudinal G force sensor (Gx), changes in acceleration pedal sensor input, brake pedal sensor input and/or various other data related to speed and/or acceleration of the vehicle.

The ECU 102 may assign a weight to each parameter. For example, as set forth above, the weight of change in vehicle speed (acceleration) may be higher than the weight of vehicle speed in absolute value when estimating the amount of available kinetic energy. The ECU 102 performs a weighted judgment based on the first data and the second data to compare the first energy potential value corresponding to available solar load or energy and the second energy potential value corresponding to the available kinetic energy (step 678). In addition to solar load or energy, other types of radiation/thermal energy can also be considered, as discussed above with respect to FIG. 1.

The ECU 102 controls the valves/pumps 116 based on the result of the comparison. If the first energy generation potential value (available solar load or energy) is greater than the second energy generation potential value (available kinetic energy), then the ECU 102 opens the A-B valves between the upper and lower fluid tubes (e.g., upper-lower valves 316*a-b* in FIGS. 3A-3D). If the second energy generation potential value is greater than the first energy generation potential value, then the ECU 102 opens the A-A valves (e.g., the upper valves 316*a* that control the fluid flow in the upper fluid tubes 320*a*) and/or B-B valves (e.g., the lower valves 316*b* that control the fluid flow in the lower fluid tubes 320*b*).

In FIG. 6, the valve control is shown as being based on both the first and second data. Alternatively, the valves/pumps 116 can be controlled based on only one of the first data and the second data. If the first data indicates that the first energy generation potential value is greater than a first threshold value, the ECU 102 may open A-B valves (e.g., the upper-lower valves 316a-b in FIGS. 3A-3D). Similarly, if the second data indicates that the second energy generation potential value is greater than a second threshold value, the ECU 102 may open A-A valves (e.g., the upper valves 316a) and B-B valves (e.g., the lower valves 316b).

Referring to FIGS. 3A-D and 6, a mechanical pressure-triggered valve may be provided between the upper fluid tubes 320a and the lower fluid tubes 320b. One or more of the upper-lower valves/pumps 316a-b(1), ... 316a-b(n) may be a mechanical pressure-triggered valve. The pressure-triggered valve is configured to automatically open (step 676) when the pressure value and/or the pressure differential value is greater than or equal to a pressure threshold value (e.g., X7 PSI in step 674). The pressure-triggered valve may automatically close once the pressure and/or the pressure differential value drops below the pressure threshold value X7. If the pressure of the upper fluid tubes 320a or the pressure differential between the upper fluid tubes 320a and the lower fluid tubes 320b increases above a threshold valve X7 (PSI), the mechanical pressure-triggered valve may automatically open to allow top-down fluid flow. This advantageously allows generation of energy even when the vehicle is not being operated. For example, if the vehicle is parked in an open air parking lot and exposed to sunlight, the pressure-triggered valve may open automatically, allowing top-down flow of the fluid (from the upper fluid tubes 320a to the lower fluid tubes 320b). Therefore, an advantage of the present invention is that electrical energy can be generated even when the vehicle 300 is not being operated. The stored electrical energy can be utilized for powering operations of the vehicle 300 once the vehicle 300 is operated.

Another advantage of using the pressure-triggered valve 316a-b is that when light radiant/thermal energy is not high, the fluid pressure is not high, and therefore the valve remains closed. As such, the top-down fluid flow is reserved for when the fluid pressure and/or the pressure differential is high enough for generating a considerable amount of electrical energy. Without the pressure-triggered valve 316a-b, the fluid may slowly flow from the upper fluid tubes 320a to the lower fluid tubes 320b over a prolonged period without generating adequate energy, for example, if the car is parked indoor. Accordingly, the pressure-triggered valve 316a-b advantageously enhances energy generation by allowing top-down flow when it is efficient to generate energy using light radiant/thermal energy.

Therefore, the system of the present invention provides an effective solution for dynamically harnessing light radiant energy, thermal energy, and/or the vehicle's kinetic energy. The steps of the flowcharts described above with respect to FIGS. 5 and 6 are not necessarily performed in the order illustrated. The terms "first" and "second" are used to distinguish aspects of the process without restricting the steps to a particular order. For example, detection of the second data (step 542) and determination of the second energy generation potential value (step 546) may be performed before, after, or simultaneously with detection of the first data (step 540) and determination of the first energy generation potential value (step 544).

While only certain embodiments of the invention have been described in detail, a person skilled in the art would appreciate that certain changes and modifications may be made in the embodiments without departing from the spirit and scope of the invention. A person skilled in the art would appreciate the invention may be practiced other than as specifically described with respect to the foregoing embodiments of the method/system.

The invention claimed is:

1. A vehicle having a battery for storing electrical energy, the vehicle comprising:
    a body portion having a roof, a trunk with a top surface, a hood and an underbody panel;
    at least one upper fluid tube containing a fluid configured to expand in response to receiving thermal energy or solar radiant energy, at least a portion of the at least one upper fluid tube positioned proximal to at least one of the roof, the top surface of the trunk, or the hood;
    at least one lower fluid tube containing the fluid, coupled with the body portion of the vehicle, and fluidly coupled with the at least one upper fluid tube, at least a portion of the at least one lower fluid tube positioned proximal to the underbody panel;
    at least one lower valve or pump for controlling a flow of the fluid in the at least one lower fluid tube;
    at least one upper-lower valve or pump for controlling a flow of the fluid between the at least one upper fluid tube and the at least one lower fluid tube;
    at least one fluid turbine coupled with the at least one upper fluid tube or the at least one lower fluid tube, and having blades configured to be rotated by the fluid;
    a generator coupled with the at least one fluid turbine for converting kinetic energy from the rotation of the blades of the at least one fluid turbine to electrical energy stored in the battery; and
    an electronic control unit configured to control, using the at least one lower fluid valve or pump and the at least one upper-lower valve or pump, the flow of the fluid in the at least one lower fluid tube and the flow of the fluid from the at least one upper fluid tube to the at least one lower fluid tube and from the at least one lower fluid tube to the at least one upper fluid tube to enhance generation of electrical energy stored in the battery.

2. The vehicle of claim 1, further comprising:
    at least one upper valve or pump for controlling a flow of the fluid in the at least one upper fluid tube,
    wherein the electronic control unit is further configured to control, using the at least one upper valve or pump, the flow of the fluid in the at least one upper fluid tube.

3. The vehicle of claim 2, further comprising:
    one or more sensors for detecting a value indicative of an amount of kinetic energy available for conversion to electrical energy,
    wherein the electronic control unit is further configured to:
        control, using the at least one lower valve or pump, the flow of the fluid within the at least one lower fluid tube based on the value indicative of the amount of kinetic energy available for conversion to electrical energy, and
        control, using the at least one upper valve or pump, the flow of the fluid within the at least one upper fluid tube based on the value indicative of the amount of kinetic energy available for conversion to electrical energy.

4. The vehicle of claim 3, wherein the one or more sensors includes at least one of an acceleration pedal configured to detect an acceleration pedal position, an inertial measurement unit configured to detect positioning, velocity, or acceleration of the vehicle, or a vehicle speed sensor for detecting a speed of the vehicle, and
    wherein the electronic control unit is configured to control a flow of the fluid in the at least one upper fluid tube, in the at least one lower fluid tube, or between the at least one upper fluid tube and the at least one lower fluid tube based on at least one of the acceleration pedal position, the positioning, velocity, or acceleration of the vehicle, or the speed of the vehicle.

5. The vehicle of claim 1, further comprising:
one or more sensors configured to detect a value corresponding to an amount of available thermal energy or solar radiant energy on at least one of the roof, the top surface of the trunk, or the hood,
wherein the electronic control unit is further configured to control, using the at least one upper-lower valve or pump, the flow of the fluid between the at least one upper fluid tube and the at least one lower fluid tube based on the detected value corresponding to the amount of available thermal energy or solar radiant energy.

6. The vehicle of claim 1, further comprising:
one or more sensors configured to detect a value corresponding to an amount of available thermal energy or solar radiant energy on at least one of the roof, the top surface of the trunk, or the hood,
wherein the electronic control unit is further configured to:
determine a first energy generation potential value corresponding to an estimated amount of electrical energy that can be generated using thermal energy or solar radiant energy based on the detected value,
determine a second energy generation potential value corresponding to an estimated amount of electrical energy that can be generated using kinetic energy of the vehicle based on at least one of a speed of the vehicle, a frequency of acceleration of the vehicle, or a fluid pressure of the at least one upper fluid tube or of the at least one lower fluid tube, and
activate, using the at least one upper-lower valve or pump, the flow of the fluid from the at least one upper fluid tube to the at least one lower fluid tube when or after the first energy generation potential value is greater than the second energy generation potential value.

7. A system for storing electrical energy in a battery of a vehicle, the system comprising:
at least one upper fluid tube containing a fluid configured to expand in response to receiving thermal energy or solar radiant energy, at least a portion of the at least one upper fluid tube positioned proximal to at least one of a roof, a top surface of a trunk, or a hood of the vehicle;
at least one lower fluid tube containing the fluid and fluidly coupled with the at least one upper fluid tube, at least a portion of the at least one lower fluid tube positioned proximal to an underbody panel of the vehicle;
at least one lower valve or pump for controlling a flow of the fluid in the at least one lower fluid tube;
at least one upper-lower valve or pump for controlling a flow of the fluid between the at least one upper fluid tube and the at least one lower fluid tube;
at least one fluid turbine coupled with the at least one upper fluid tube or the at least one lower fluid tube, and having blades configured to be rotated by the fluid;
a generator coupled with the at least one fluid turbine for converting kinetic energy from the rotation of the blades of the at least one fluid turbine to electrical energy stored in the battery; and
an electronic control unit configured to control, using the at least one lower fluid valve or pump and the at least one upper-lower valve or pump, the flow of the fluid in the at least one lower fluid tube and the flow of the fluid from the at least one upper fluid tube to the at least one lower fluid tube and from the at least one lower fluid tube to the at least one upper fluid tube to enhance generation of electrical energy stored in the battery.

8. The system of claim 7, further comprising:
at least one upper valve or pump for controlling a flow of the fluid in the at least one upper fluid tube,
wherein the electronic control unit is further configured to control, using the at least one upper valve or pump, the flow of the fluid in the at least one upper fluid tube.

9. The system of claim 8, further comprising:
one or more sensors for detecting a value indicative of an amount of kinetic energy available for conversion to electrical energy,
wherein the electronic control unit is further configured to:
control, using the at least one lower valve or pump, the flow of the fluid within the at least one lower fluid tube based on the value indicative of the amount of kinetic energy available for conversion to electrical energy, and
control, using the at least one upper valve or pump, the flow of the fluid within the at least one upper fluid tube based on the value indicative of the amount of kinetic energy available for conversion to electrical energy.

10. The system of claim 9, wherein the one or more sensors includes at least one of an acceleration pedal configured to detect an acceleration pedal position, an inertial measurement unit configured to detect positioning, velocity, or acceleration of the vehicle, or a vehicle speed sensor for detecting a speed of the vehicle, and
wherein the electronic control unit is configured to control a flow of the fluid in the at least one upper fluid tube, in the at least one lower fluid tube, or between the at least one upper fluid tube and the at least one lower fluid tube based on at least one of the acceleration pedal position, the positioning, velocity, or acceleration of the vehicle, or the speed of the vehicle.

11. The system of claim 7, further comprising:
one or more sensors configured to detect a value corresponding to an amount of available thermal energy or solar radiant energy on at least one of the roof, the top surface of the trunk, or the hood,
wherein the electronic control unit is further configured to control, using the at least one upper-lower valve or pump, the flow of the fluid between the at least one upper fluid tube and the at least one lower fluid tube based on the detected value corresponding to the amount of available thermal energy or solar radiant energy.

12. The system of claim 7, further comprising:
one or more sensors configured to detect a value corresponding to an amount of available thermal energy or solar radiant energy on at least one of the roof, the top surface of the trunk, or the hood,
wherein the electronic control unit is further configured to:
determine a first energy generation potential value corresponding to an estimated amount of electrical energy that can be generated using thermal energy or solar radiant energy based on the detected value,
determine a second energy generation potential value corresponding to an estimated amount of electrical energy that can be generated using kinetic energy of the vehicle based on at least one of a speed of the vehicle, a frequency of acceleration of the vehicle, or a fluid pressure of the at least one upper fluid tube or of the at least one lower fluid tube, and activate, using the at least one upper-lower valve or pump, the flow of the fluid from the at least one upper fluid tube to the at least one lower fluid tube when or after the first energy generation potential value is greater than the second energy generation potential value.

13. A method for storing electrical energy in a battery of a vehicle, the method comprising:

storing, by an upper fluid tube and a lower fluid tube, a fluid configured to expand in response to receiving thermal energy or solar radiant energy, at least a portion of the upper fluid tube positioned proximal to at least one of a roof, a top surface of a trunk, or a hood of the vehicle, and at least a portion of the lower fluid tube positioned proximal to an underbody panel of the vehicle, the upper fluid tube being fluidly coupled with the lower fluid tube;

controlling, by a lower valve or pump, a flow of the fluid in the lower fluid tube;

controlling, by an upper-lower valve or pump, a flow of the fluid between the upper fluid tube and the lower fluid tube;

rotating, by the fluid, blades of a fluid turbine coupled with the upper fluid tube or the lower fluid tube;

converting, by a generator coupled with the fluid turbine, kinetic energy from the rotation of the blades of the fluid turbine to electrical energy stored in the battery;

controlling, by an electronic control unit using the lower fluid valve or pump and the upper-lower valve or pump, the flow of the fluid in the lower fluid tube and the flow of the fluid from the upper fluid tube to the lower fluid tube and from the lower fluid tube to the upper fluid tube to enhance generation of electrical energy stored in the battery.

14. The method of claim 13, further comprising:

detecting, by one or more sensors, a value indicative of an amount of kinetic energy available for conversion to electrical energy, controlling, by the electronic control unit using the lower valve or pump, the flow of the fluid within the lower fluid tube based on the value indicative of the amount of kinetic energy available for conversion to electrical energy, and controlling, by the electronic control unit using an upper valve or pump, the flow of the fluid within the upper fluid tube based on the value indicative of the amount of kinetic energy available for conversion to electrical energy.

15. The method of claim 14, wherein the one or more sensors includes at least one of an acceleration pedal configured to detect an acceleration pedal position, an inertial measurement unit configured to detect positioning, velocity, or acceleration of the vehicle, or a vehicle speed sensor for detecting a speed of the vehicle, and wherein the method further comprises controlling, by the electronic control unit, a flow of the fluid in the upper fluid tube, in the lower fluid tube, or between the upper fluid tube and the lower fluid tube based on at least one of the acceleration pedal position, the positioning, velocity, or acceleration of the vehicle, or the speed of the vehicle.

16. The method of claim 13, further comprising:

detecting, by one or more sensors, a value corresponding to an amount of available thermal energy or solar radiant energy on at least one of the roof, the top surface of the trunk, or the hood, controlling, by the electronic control unit using the upper-lower valve or pump, the flow of the fluid between the upper fluid tube and the lower fluid tube based on the detected value corresponding to the amount of available thermal energy or solar radiant energy.

17. The method of claim 13, further comprising:

detecting, by one or more sensors, a value corresponding to an amount of available thermal energy or solar radiant energy on at least one of the roof, the top surface of the trunk, or the hood;

determining, by the electronic control unit, a first energy generation potential value corresponding to an estimated amount of electrical energy that can be generated using thermal energy or solar radiant energy based on the detected value;

determining, by the electronic control unit, a second energy generation potential value corresponding to an estimated amount of electrical energy that can be generated using kinetic energy of the vehicle based on at least one of a speed of the vehicle, a frequency of acceleration of the vehicle, or a fluid pressure of the upper fluid tube or of the lower fluid tube; and activating, by the electronic control unit using the upper-lower valve or pump, the flow of the fluid from the upper fluid tube to the lower fluid tube when or after the first energy generation potential value is greater than the second energy generation potential value.

* * * * *